Figure 1:
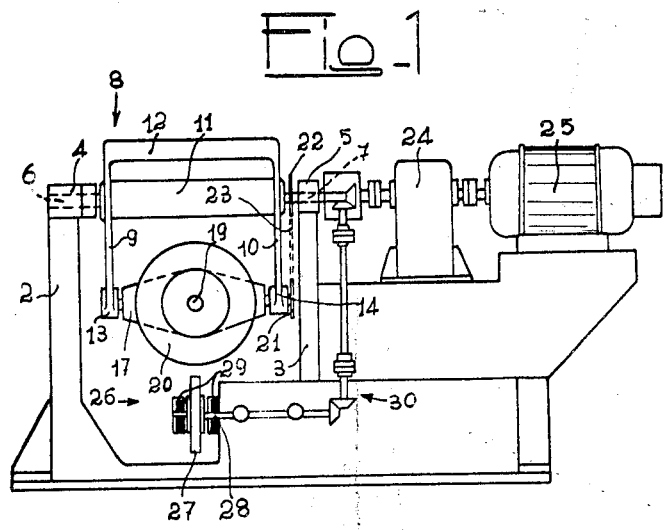

Sept. 21, 1965  T. PASSONI  3,207,020
FLYING SAW FOR HOT CUTTING METAL TUBES
Filed July 27, 1964  4 Sheets-Sheet 1

Sept. 21, 1965        T. PASSONI        3,207,020
FLYING SAW FOR HOT CUTTING METAL TUBES
Filed July 27, 1964        4 Sheets-Sheet 2
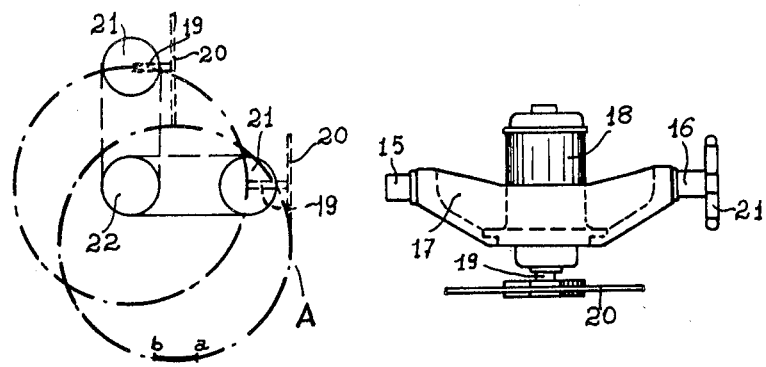
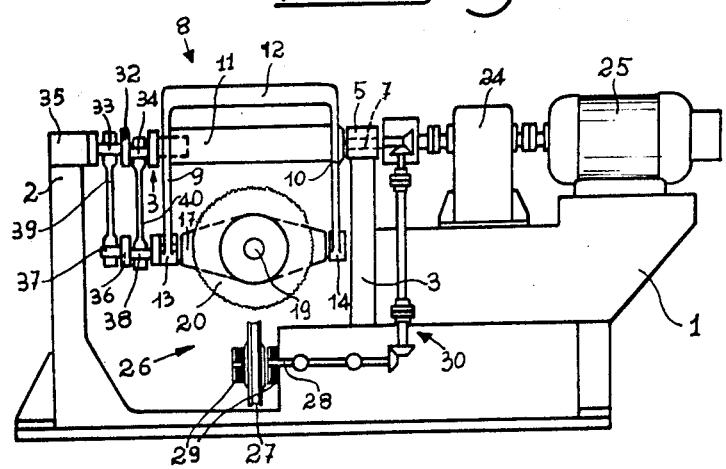

Sept. 21, 1965  T. PASSONI  3,207,020
FLYING SAW FOR HOT CUTTING METAL TUBES
Filed July 27, 1964  4 Sheets-Sheet 4
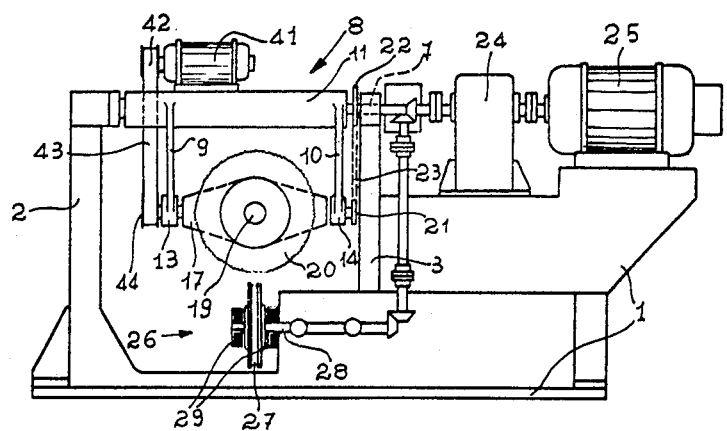
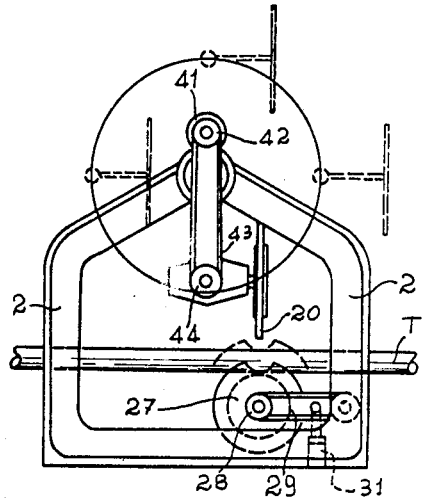
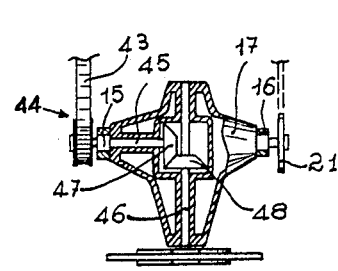

United States Patent Office 3,207,020
Patented Sept. 21, 1965

3,207,020
FLYING SAW FOR HOT CUTTING
METAL TUBES
Terenzio Passoni, Milan, Italy, assignor to Innocenti Soc.
Generale per l'Industria Metallurgica e Meccanica,
Milan, Italy
Filed July 27, 1964, Ser. No. 385,314
Claims priority, application Italy, Aug. 19, 1963,
17,409/63
5 Claims. (Cl. 83—327)

This invention relates to flying saws for hot cutting metal tubes issuing at a high rate of speed from rolling mills.

Flying saws having a cutting disc mounted on a movable frame performing an oscillating or rotary motion are known, the path of the said disc intersecting at uniform intervals the path of the tube, the disc and tube moving at the same speed in order to cut the tube in a direction normal to the tube axis.

The invention relates more particularly to saws of the abovementioned type adapted to cut to variable length metal tubes issuing at high speed from rolling mills, the speed reaching or even exceeding ten meters per second. Consequently, the saw has to effect a cut at intervals of two seconds or less.

The object of this invention is to provide a flying saw of the abovementioned type which is tough and simple in manufacture, of light weight. A further object is to equilibrate the rotary frame carrying a balanced disc cutter so as to afford a higher rotational speed corresponding to the high translational speed of the tube. Balancing of the movable frame moreover affords a higher sensitivity in control of its rotational speed in order to synchronize the movements of the flying saw and tube, respectively, during cutting.

According to this invention the above and further objects are provided by employing a flying saw for hot cutting of a metal tube moving in the direction of its longitudinal axis, of the type in which the cutter comprises a disc rotating about its own axis and performing an orbital movement about an axis perpendicular to the rotational axis of the disc, the said flying saw comprising a foundation, means for guiding and feeding the tube to the path of the disc, supported by the foundation, and supporting means for said disc, characterized by the fact that the supporting means comprise two spaced stationary frames fast with the said foundation, extending upwardly on both sides of the axis of the tube motion, and a movable frame substantially of U shape comprising two lateral arms rotatably mounted about an axis normal to the tube axis between the said stationary frames, a cross bar rotatably mounted between the ends of the said arms about an axis parallel with the rotational axis of the movable frame, a shaft for the cutter mounted on the said cross bar for rotation about an axis perpendicular to the rotational axis of the cross bar, a counterweight secured to the movable frame on the remote side of the lateral arms, a pivot fast with the movable frame, coaxially arranged with the rotational axis of the latter, a motor secured to the foundation and coupled with the said pivot, means adapted to rotate the cross bar and cutter disc about their respective axes and means for constantly maintaining the said cutter shaft in a parallel relationship to the tube axis.

The invention shall be described with reference to the accompanying drawings which show embodiments thereof by way of example.

Figure 2:
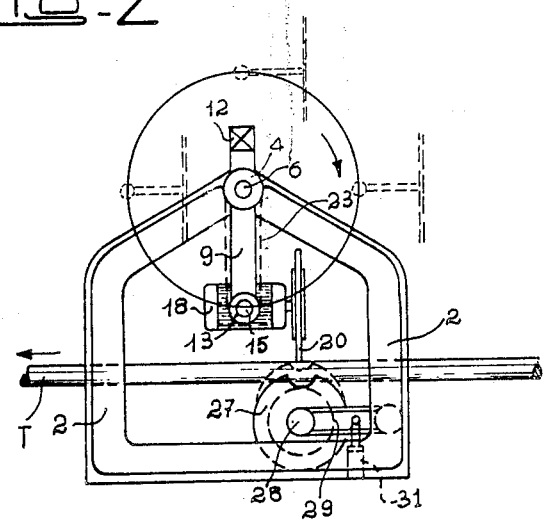
Figure 6:
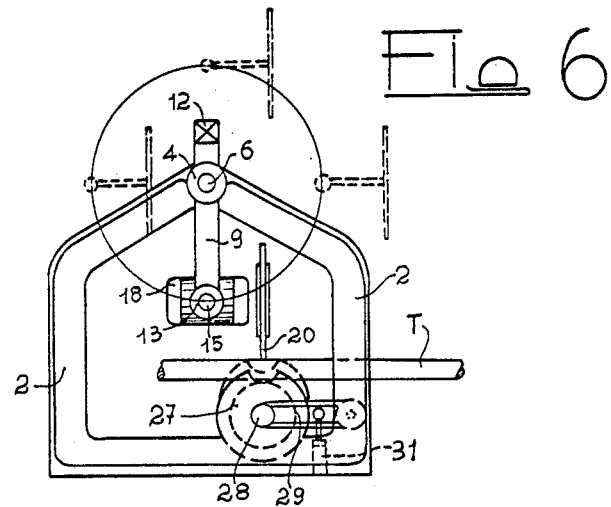
Figure 7:
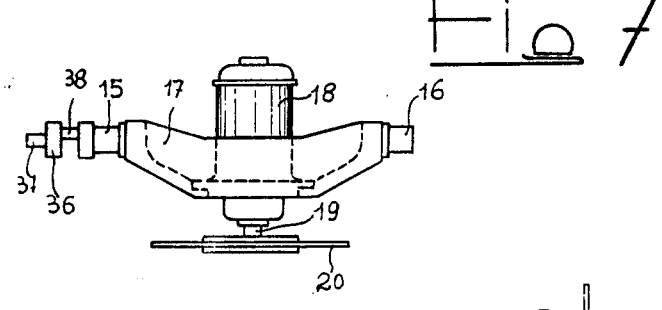
Figure 8:
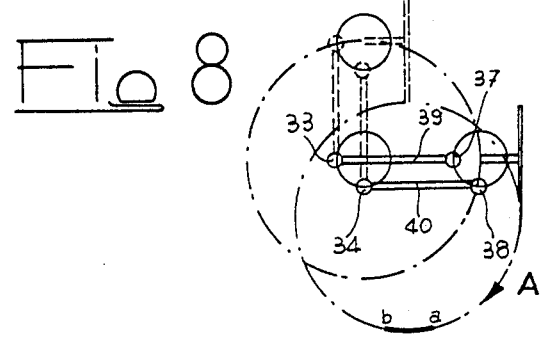

FIGURE 1 is a diagrammatical elevational view of an embodiment of the flying saw according to this invention, FIGURE 2 is a front view thereof, FIGURE 3 is a detail view on an enlarged scale of FIGURE 1 in plan view, FIGURE 4 is a diagrammatical view of the control for the orbital motion of the cutter disc according to FIGURE 1, FIGURES 5 and 9 are elevational views of two further embodiments, FIGURES 6 and 10 are corresponding side views, FIGURES 7 and 11 are detail views on an enlarged scale of FIGURES 5 and 9, FIGURE 8 is a diagrammatical representation of the control means for the orbital movement of the cutter disc according to FIGURE 5.

Referring to FIGURES 1 and 4 the flying saw comprises a foundation 1 having secured thereto two frames 2, 3 extending upwardly arranged in a spaced parallel relationship.

A support 4, 5, respectively is secured to the top of each frame. The supports are coaxially arranged and adapted to rotatably support the pivots 6, 7 of a movable frame 8 substantially of U shape, comprising two parallel arms 9, 10 interconnected by a cross bar 11 arranged coaxially with the pivots 6, 7. A counterweight 12 is secured to the ends of the arms 9, 10 in order to dynamically balance the said arms and components supported by the latter as described hereafter. The ends of the arms 9, 10 remote from the counterweight 12 are each provided with a support 13, 14, respectively. The supports are coaxially arranged along an axis extending parallel with the axis of the pivots 6, 7 and rotatably carry pivots 15, 16, respectively, secured to the opposite end of a cross bar 17 having attached thereto an electric motor 18, the driving shaft 19 of which overhangs in a plane orthogonal to the rotational axis of the cross bar 17 extending through the pivots 15, 16. A cutter disc 20 is secured in a known manner to the free end of the shaft 19.

A toothed wheel 21 is keyed to the pivot 16 on the cross bar 17. A similar toothed wheel 22 is rigidly secured to the support 15 in such manner that the wheel is coaxial with the rotational axis of the movable frame 8.

The wheels 21, 22 have an endless chain 23 travelling over them so as to maintain the shaft 19 in a horizontal position.

The pivot 7 is connected through a reducing gear 24 to an electric motor 25, both the reducing gear and motor being securedly fixed to the foundation 1. A device 26 of known type, adapted to guide and feed the tube T to the path of the cutter disc 20 is mounted on the foundation 1 between the stationary frames 2, 3. The device 26 comprises a guide roller 27 keyed to a pin 28 extending parallel with the axis extending through the pivots 6, 7, rotatably mounted in a swing arm 29. The pivot 28 is drivingly connected with the pivot 7 by a drive gear 30. The oscillations of the arm 29 are effected by a known device (not shown) comprising a hydraulic servo motor 31.

The flying saw operates as follows:

After starting the motors 25 and 18 the movable frame 8 and disc 20 rotate about their respective axes, the disc moreover performing an orbital motion along a path A (FIG. 4) with respect to the rotational axis of the movable frame. At the same time the chain 23 travels over the stationary toothed wheel 22 and carries along the movable toothed wheel 21, whereby the latter performs the same number of revolutions as the frame 8 and the cross bar 17 rotating about its axis holds the shaft 19 for the disc 20 constantly parallel with the axis of the tube T. Consequently, the disc 20 is constantly maintained in a transverse plane to the said axis.

When the disc 20 is at the bottom of its path A the roller 27 is lifted so that the path of the tube T intersects the path of the disc 20. The disc 20 cuts the tube T at the section a–b of the path A, wherein the rate of speed of the tube T and horizontal component of the orbital rate of speed of the disc 20 are substantially the same.

The flying saws shown in FIGURES 5 to 11 are similar in construction to the saw described above; corresponding parts are provided with the same reference numerals as employed in FIGURES 1 to 3.

In the embodiment shown in FIGURES 5 to 8 the drive gear comprising a chain 23 and toothed wheels 21, 22 is replaced by a device comprising a crank shaft 32 having two cranks and pins 33, 34 offset through 90°. The shaft 32 overhangs between the support 3 and top 35 of the frame 2. A similar crank shaft 36 having two cranks and pins 37, 38 is secured as an extension of the pivot 15 on the cross bar 17.

The pins 33, 37 and 34, 38 are interconnected by two connecting rods 39, 40 similar in length in order to rotate the cross bar 10 and maintain the shaft 19 horizontal during rotation of the movable frame 8.

In the embodiment shown in FIGURES 9 to 11, with a view to make the movable frame 8 lighter in weight, the motor 41 driving the cutter 20 is secured to the cross bar 11 on the remote side of the arms 9, 10 and acts similarly to the counterweight 12 in FIGURES 1 and 5.

The cutter is driven by means of a drive gear comprising a pulley 42 keyed to the shaft of the motor 41, a belt 43 and a pulley 44 keyed to a shaft 45 loosely mounted coaxially with the pivot 15 on the cross member 17.

The shaft 45 is coupled with a shaft 46 loosely mounted in a middle plane of the cross member 17, carrying the cutter 20 by means of a bevel wheel pair 47, 48.

During rotation of the movable frame 8 the shaft 46 is kept parallel with the axis of the tube T by means of a chain and sprocket drive as described with reference to FIGS. 1 to 3, comprising sprocket wheels 21, 22 interconnected by an endless sprocket 23.

Constructional details and embodiments can of course be widely varied with respect to the example described and shown without departing from the scope of this invention.

By way of example, the means keeping the shaft 19 for the cutter 20 parallel with the axis of the tube T can comprise a drive gear comprising a bevel wheel secured to one support for the pivots of the movable frame 8 and a similar bevel wheel secured to the corresponding pivot on the cross bar 17, the said toothed wheels being interconnected by means of a shaft fitted with bevel wheels at both ends.

What I claim is:

1. Flying saw for hot cutting a metal tube moving in the direction of its longitudinal axis, of the type wherein the cutter comprises a disc rotating about its own axis and performing an orbital motion about an axis perpendicular to the rotational axis of the disc, the said flying saw comprising a foundation, means for guiding and feeding the tube to the path of the cutter supported by the said foundation, and supporting means for the said cutter, characterized by the fact that the supporting means comprise two stationary spaced frames securedly fixed to the foundation extending upwardly on both sides of the axis along which the tube moves, and a movable frame substantially of U shape, comprising two lateral arms mounted for rotation about an axis normal to the axis of the tube between the said stationary frames, a cross bar mounted for rotation between the ends of the said arms about an axis parallel to the rotational axis of the movable frame, a shaft for the cutter mounted on the said cross bar for rotation about an axis perpendicular to the rotational axis of the cross bar, a counterweight secured to the movable frame on the remote side of the lateral arms, a pivot fast with the movable frame coaxial with the rotational axis of the latter, a motor secured to the foundation coupled with the said pivot, means adapted to rotate the cross bar and cutter shaft about their respective axes and means for keeping the said cutter shaft constantly parallel with the axis of the tube.

2. Flying saw as claimed in claim 1, characterized by the fact that the saw comprises a motor securedly fixed to the cross bar having its shaft overhanging in a middle plane of the cross bar and adapted to receive the cutter.

3. Flying saw as claimed in claim 1, characterized by the fact that the means adapted to keep the cutter shaft parallel with the axis of the tube comprise a toothed wheel keyed to a pivot fast with the cross bar and coaxial with the rotational axis of one stationary frame and coaxial with the rotational axis of the movable frame and an endless sprocket chain travelling over the said toothed wheels.

4. Flying saw as claimed in claim 1, characterized by the fact that the means adapted to keep the cutter shaft parallel with the axis of the tube comprise a crank shaft having two cranks securedly fixed to one stationary frame and coaxial with the rotational axis of the movable frame, the pins on the cranks being offset through 90°, a similar shaft having two cranks and pins securedly fixed to the cross bar and coaxial with the rotational axis of the latter, two connecting rods similar in length mounted on their respective pins on the crank shaft of the movable frame and of the crank shaft of the cross bar.

5. Flying saw as claimed in claim 1, characterized by the fact that the counterweight comprises a motor secured to the movable frame on the remote side of the arms, the said motor being drivingly connected with a shaft loosely mounted on the cross bar and coaxial with the rotational axis of the latter by means of a belt drive, the said shaft being coupled with a shaft loosely mounted on the cross bar and adapted to receive the cutter by means of a bevel wheel pair.

No references cited.

WILLIAM W. DYER, Jr., *Primary Examiner.*